United States Patent
Spease et al.

[11] Patent Number: 5,803,654
[45] Date of Patent: Sep. 8, 1998

[54] CONTROL CABLE MOUNTING SYSTEM

[75] Inventors: Arthur L. Spease, Montgomery; James G. Ryan, Conroe; Stephen A. Sauer, Montgomery, all of Tex.; Bernard Driggers, Wichita, Kans.; William H. Grojean, Nashville, Ark.

[73] Assignee: Capro, Inc., Willis, Tex.

[21] Appl. No.: 738,771

[22] Filed: Oct. 29, 1996

Related U.S. Application Data

[63] Continuation-in-part of Ser. No. 550,452, Oct. 30, 1995, abandoned.

[51] Int. Cl.$^6$ ............................................ F16C 1/10
[52] U.S. Cl. ..................... 403/384; 403/399; 403/396; 248/74.1; 248/74.2; 74/502.4
[58] Field of Search ..................... 403/395, 396, 403/397, 398, 399, 384; 248/74.1, 74.2, 73; 254/384; 242/615.3; 74/502.4, 502.6; 411/182, 60

[56] References Cited

U.S. PATENT DOCUMENTS

| | | | |
|---|---|---|---|
| 639,337 | 12/1899 | Anthony | 403/405.1 |
| 4,386,752 | 6/1983 | Pavlak et al. | 248/73 |
| 4,461,189 | 7/1984 | Rottenkolber et al. | 74/506 X |
| 5,016,843 | 5/1991 | Ward | 248/74.2 X |

FOREIGN PATENT DOCUMENTS

| | | | |
|---|---|---|---|
| 888450 | 1/1962 | United Kingdom | 411/182 |

*Primary Examiner*—Anthony Knight
*Attorney, Agent, or Firm*—Alan R. Thiele; Jenkens & Gilchrist

[57] ABSTRACT

A control cable and conduit assembly mounting system includes a pair of integrally formed, arcuate, spaced-apart, flexible flanges which substantially encircle a hollow handlebar or frame member. Also included is a post contained between the flanges which extends through a hole formed in the wall of the tubular handlebar or frame member. The post provides axial and rotational position stability and resists displacing forces caused by movement of the control cable or other forces tending to move the control cable along or rotate the conduit around the handlebar or frame member. The flexible flanges maintain the control cable and conduit assembly in a position proximate to the handlebar or frame member. The elimination of the use of screws or fasteners allows for the cable center line to be parallel with the center line of the handlebar or frame member.

8 Claims, 5 Drawing Sheets

5,803,654

CONTROL CABLE MOUNTING SYSTEM

This application is a continuation-in-part of U.S. patent application Ser. No. 08/550,452 filed Oct. 30, 1995, now abandoned.

BACKGROUND

The present invention pertains to control cable mounting systems; more particularly, the present invention pertains to control cable mounting systems for use with devices having a hollow tubular handlebar or frame member along which one or more control cables are guided, positioned and retained.

In many devices, such as lawn mowers and bicycles, operation of subsystems or subassemblies is accomplished by the placement of an axial force on a control cable. Typically, the control cable is contained within an outer sheath or conduit. This sheathed cable containment system allows the control cable to be either pushed or pulled along a predetermined path. For example, the movement of sheathed control cables may be used to (a) position the throttle on the carburetor on the engine of a lawn mower, (b) cause the brake pads to engage the rim of a bicycle wheel or (c) activate the clutch on a motorcycle or lawn mower. In such applications the control cable moves within an outer sheath or conduit and applies an actuating force to a remotely located device or system. Without retention of the outer sheath or conduit in position while the control cable moves within the outer sheath or conduit, the control cable is rendered inoperable.

It is highly desirable to assure that the control cable and its outer sheath or conduit is permanently mounted or positioned and retained on the handlebar or frame member. Such mounting of the control cable should resist forces on the control cable parallel to the handlebar, perpendicular to the handlebar and tangential to the handlebar or frame member.

The permanent positioning and retention of control cables and their sheaths near the handlebar or frame member often has been done by using either load bearing circular clamps, or fastening them in place by a nut and bolt, a self-tapping screw or a welded flange or cup. Such nut and bolt, self-tapping screw or welded device provide the mounting for the sheath or conduit to resist those forces which tend to separate the control cable assembly from its position on the handlebar or frame member. Typically, these attaching methods require multiple parts and operations which increase complexity and assembly labor. Thus, it has become both time-consuming and cumbersome to manufacture a device by which the control cables and their outer sheaths or conduits are positioned and retained on a tubular handlebar or frame member, by using small load bearing clamps which have fittings which are bolted, screwed or welded in place. The multiple parts in the fittings are assembled together for positioning the cable to one side or the other of the handlebar or frame member.

There is, therefore, a need in the art for a simple control cable positioning and retaining system that will permanently position, retain, attach and fix the position of a control cable and its outer sheath or conduit near a tubular handlebar or frame member. Such control cable positioning and retaining system should be easy to use, simple to install, and inexpensive by reducing parts and labor. It should also be able to use the hole which was used in prior art systems to bolt an end fitting in place; therefore providing complete interchangeability of components.

SUMMARY

There is provided by the present invention a control cable positioning and retaining system that is easy to use, simple to install on a handlebar or frame member and inexpensive. Specifically, the control cable positioning and retaining system of the present invention which positions the cable parallel to the center line of the tubular handlebar or frame member resists forces on at least one control cable parallel to the handlebar or frame member, perpendicular to the handlebar or frame member and tangential to the handlebar or frame member.

Formed integrally with the system for positioning and retaining at least one control cable on the handlebar or frame member is a pair of integrally molded, arcuate, spaced-apart, flexible flanges that are shaped to encircle and engage the outer surface of the tubular handlebar or frame member. Located between the integrally molded, arcuate, spaced-apart, flexible flanges is a central post. The central post is sized to fit within a hole that is either drilled or punched through the wall(s) of the hollow tubular handlebar or frame member. The central post provides axial and longitudinal position stability for the control cable positioning and retaining system. Thus, by merely inserting the central post through the drilled or punched hole in the wall of the hollow tubular handlebar or frame member and snapping the pair of integrally molded, arcuate, spaced-apart flexible flanges around the outside of the handlebar or frame member, provision is made for bearing the forces associated with movement of the control cable through its outer sheath or conduit and permanently and retaining the control cable near the handlebar or frame member.

BRIEF DESCRIPTION OF THE DRAWINGS

A better understanding of the control cable positioning and retaining system of the present invention may be had by reference to the drawing figures wherein.

DESCRIPTION OF THE EMBODIMENTS

Figure 1:
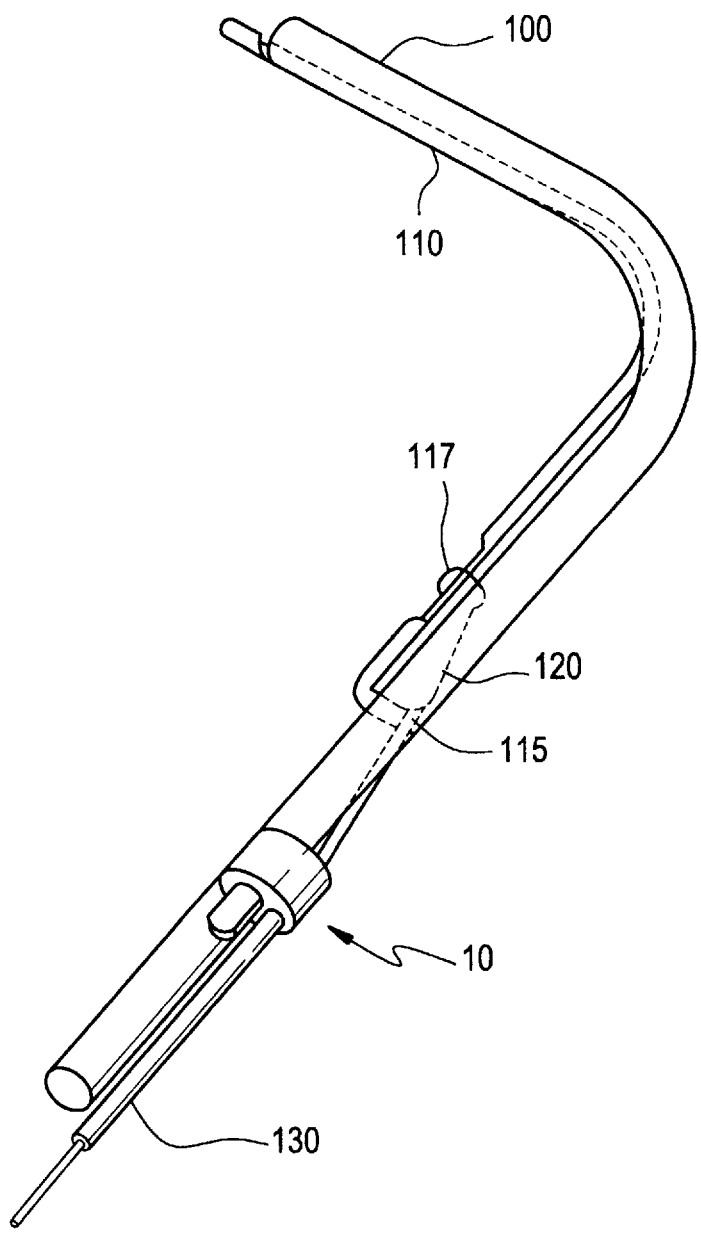
FIG. 1 is a perspective view of the control cable positioning and retaining system of the present invention mounted on a handlebar or frame member such as typically found on a lawnmower.

As may be seen by reference to FIG. 1 the control cable positioning and retaining system 10 of the present invention is typically mounted on a hollow tubular handlebar or frame member 100. Shown specifically in FIG. 1 is a handlebar assembly 100 of a lawnmower which further includes an operator safety bale 110 which is pivotably mounted 115 on the handlebar 100. When the operator safety bale 110 is pulled toward the handlebar 100 and held in close proximity thereto a cable 120 which is mounted to the operator safety bale 110 by a pivotable connection 117 is extended or pulled through its outer sheath or conduit 130.

Figure 2:
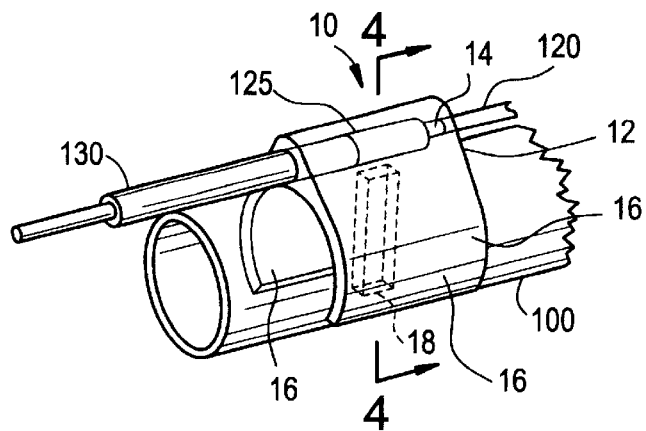
FIG. 2 is an enlarged perspective view of the control cable positioning and retaining system shown in FIG. 1.

As shown in FIG. 2 the control cable 120 is contained within an outer sheath or conduit 130. The outer sheath or conduit 130 includes an end fitting 125 through which the cable 120 exits the conduit 130. The end fitting 125 may be crimped on the outer sheath or conduit 130, spun on, or attached by a variety of other methods well known to those of ordinary skill in the art.

An enlarged view of the mounting of the control cable positioning and retaining system 10 of the present invention to a handlebar 100 is shown in FIG. 2. Therein it may be seen that the end fitting 125 of the conduit 130 fits within an internal section 1 1 in the upper enlarged portion 12 of the control cable positioning and retaining system 10 of the present invention. The control cable 120 exits the control cable positioning and retaining system 10 of the present invention through passage 14.

The pair of integrally molded, arcuate, spaced-apart flexible flanges 16 extend around either side of the exterior of the handlebar 100 to firmly hold the control cable positioning and retaining system 10 of the present invention to the handlebar 100. Slippage of the control cable positioning and retaining system 10 along the outer surface of the handlebar 100 or rotation of the control cable positioning and retaining system 10 around the handlebar 100 is prevented by the insertion of the central post 18 through a hole formed in the tubular handlebar or frame member 100. The two integrally molded, arcuate, spaced-apart flexible flanges 16 prevent the control cable positioning and retaining system 10 from moving away from the handlebar 100.

Figure 3:
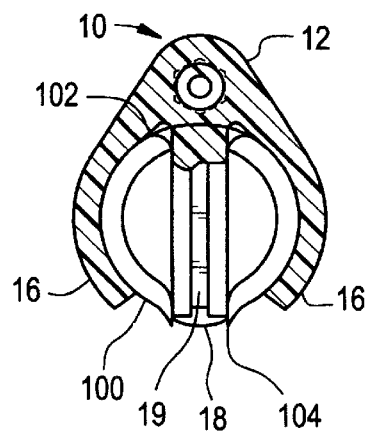
FIG. 3 is a view in partial section taken at line 4—4 of FIG. 2 wherein the control cable positioning and retaining system is placed in a hole that has been drilled from one side in the wall of a hollow tubular handlebar or frame member.
Figure 4:
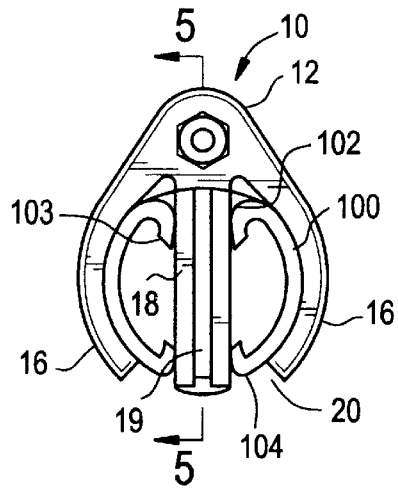
FIG. 4 is an end view of the control cable positioning and retaining system placed in a hole that has been punched from both sides in the wall of a hollow tubular handlebar or frame member.

In FIG. 3 it may be seen that the central post 18 extends first through an upper hole 102 which is drilled through the wall of the hollow tubular handlebar 100 and second through a lower hole 104 which may be formed through the wall of the hollow tubular handlebar 100. The passage of the central post 18 through both the upper hole 102 and the lower hole 104 is extremely important. In FIG. 4 it may be seen that the central post 18 extends first through the upper hole 102 which has been punched through the wall of the hollow tubular handlebar 100. Such punched holes are typically characterized by extruded metal 103 about the circumference of the hole which extends into the central hollow portion of the tubular handlebar 100. The depth of penetration of the extruded metal 103 into the central hollow portion of the tubular handlebar 100 is not constant as it depends on the type of tooling and punch conditions used to form the hole.

The bottom edge of the two integrally molded, arcuate, spaced-apart flexible flanges 16 of the control cable positioning and system 10 have a sufficient space 20 therebetween to allow them to be snapped in place over the handlebar 100 as the central post 18 is first inserted through hole 102 and thence through hole 104. If desired, the central post 18 may be hollow; that is it may have a hollow center 19. Such hollow center 19 can provide distinct advantages as will be further explained below.

Figure 5:
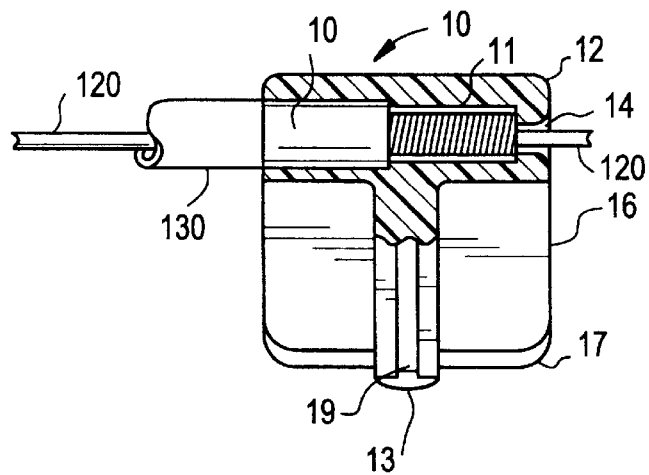
FIG. 5 is a view in partial section taken at line 4—4 of FIG. 4.

By reference to FIG. 5 it may be seen that the internal section 11 which is in the central portion of thickened portion 12 is placed between an opening 13 is large enough to accommodate the conduit 130 surrounding the control cable 120. The passage 14 is sized to accommodate and provide clearance and/or guidance for the control cable 120.

Figure 6:
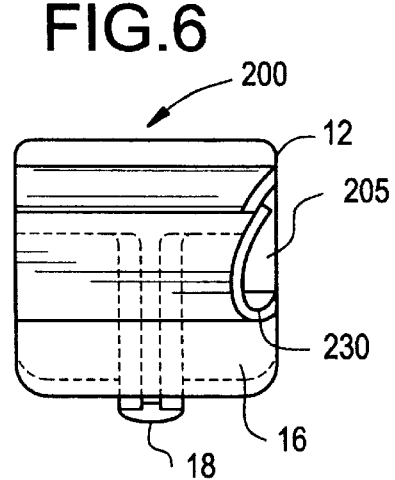
FIG. 6 is a side elevational view of a first alternate embodiment.
Figure 7:
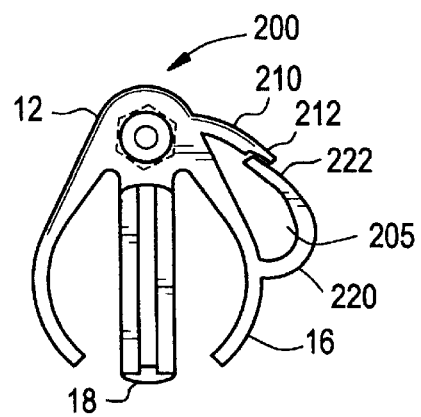
FIG. 7 is an end view of the first alternate embodiment shown in FIG. 6.
Figure 8:
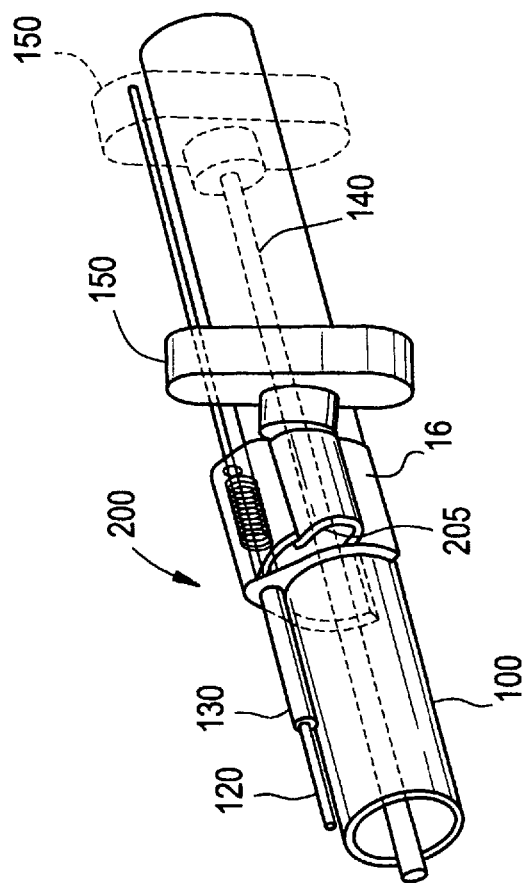
FIG. 8 is a perspective of the first alternate embodiment, illustrated in FIG. 6 and FIG. 7, mounted on a handlebar or frame member wherein a pull cord and handle is shown in both an extended and retracted position.

In FIGS. 6, 7 and 8 a first alternate embodiment 200 of the control cable positioning and retaining system of the present invention is shown. The basic construction of the first alternate embodiment 200 is similar to that of the preferred embodiment but for the addition of a keeper slot 205 formed on the outer surface of the control cable positioning and retaining system 10. It will be understood by those of ordinary skill in the art that while one keeper slot 205 is formed on the outer surface of one of the integrally molded, arcuate, spaced-apart flexible flanges 16, such keeper slot 205 may be formed on both flanges 16. Particular features of the keeper slot 205 will be described by reference numbers which begin with the number 2 in the hundreds place. Such keeper slots 205 may be used when it is necessary to locate a pull cord 140 such as that used for starting an engine in close proximity to the handlebar 100. Pull cords 140 typically terminate in a T-handle 150.

With specific reference to FIG. 7, the keeper slot 205 includes a flexible upper portion 210 which further includes a tapered section 212 at its distal end to enhance flexibility. The keeper slot 205 also includes a lower portion 220 which has a tapered section 222 at its distal end to enhance flexibility. The flexibility of both the upper portion 210 and the lower portion 220 allows for ease of insertion of the pull cord 140 into the keeper slot 205.

Returning to FIG. 6 it may be seen that one end of the keeper slot 205 may terminate in an angled surface 230. The angled surface 230 allows the T-handle 150 to be oriented in a direction facing outward from the handlebar 100 when the pull cord 140 is in its retracted position and the control handle 150 is resting against the keeper slot 205. Those of ordinary skill in the art will understand that even greater adaptability is provided if a like angled surface 230 appears at either end of the keeper slot 205.

Figure 9:
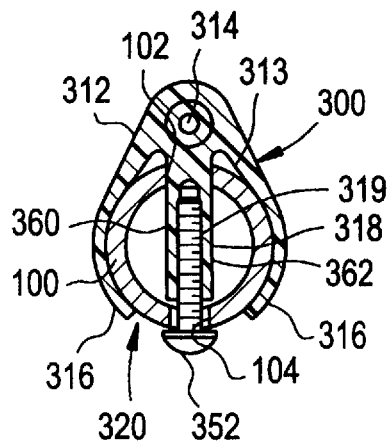
FIG. 9 is an end view in partial section of a second alternate embodiment.

In FIG. 9 a second alternate embodiment 300 of the control cable positioning and retaining system of the present invention for high load applications is shown. Similar reference numbers are used to designate those portions of the invention having similar construction and location to the preferred embodiment but for the placement of the numeral 3 in the hundreds place. In the second alternate embodiment the post 318 is shortened so that it does not extend through the lower hole 102 in the handlebar 100. In addition to the engagement of the integrally formed, arcuate, spaced-apart flexible flanges with the outer surface of the handlebar 100 the retention of the control cable positioning and retaining system 300 to the handlebar 100 is accomplished by the threadable insertion of a threaded fastener 352 into the center portion 319 of the central post 318 which extends into the hollow portion of the handlebar through hole 102. The threaded fastener 352 may either threadably engage or expand the center of the central post 318 by threadable engagement with threads formed the hollow center 319 of the post 318 or alternatively, the threaded fastener 352 may be a self-tapping screw.

Figure 10:
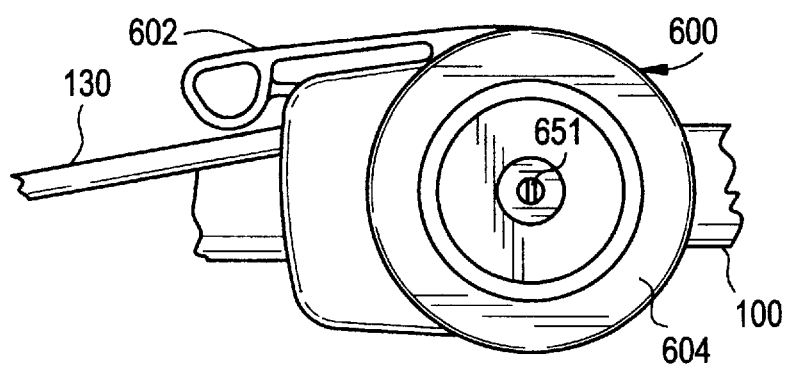
FIG. 10 is a side view of a third alternate embodiment which includes a throttle control incorporating the features of the control cable positioning and retaining device of the present invention.
Figure 11:
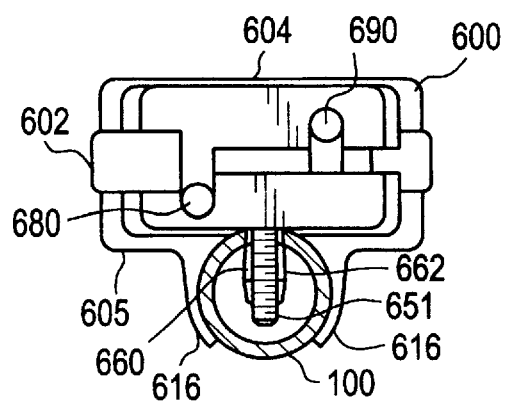
FIG. 11 is a left end elevational view of the third alternate embodiment shown in FIG. 10.

Still another embodiment 600 of the control cable positioning and retaining system of the present invention may be seen in FIGS. 10 and 11. Similar reference numbers are used to designate those portions of the invention having a similar construction and location to the preferred embodiment but for the number 6 in the hundreds place. FIG. 10 is a side view of a typical lever operated throttle control assembly 600. A throttle control cable sheath 130 is shown entering the lever operated throttle control assembly 600. As shown in FIG. 11 there are two openings 680 and 690 whose use is determined by the direction of the force to be placed on the cable by the movement of the lever 602. By moving the lever 602, the control cable (not shown) within the control cable sheath 130 is caused to move by the rotation of an arcuate surface (not shown) within the lever operated throttle control assembly 600 which is affixed to the end of the lever 602. The mounting of the arcuate surface is between an upper section 604 and a lower section 605 of the lever operated throttle control assembly 600. The upper section 604 and the lower section 605 of the lever operated throttle control assembly 600 are snapped together sandwiching the throttle lever and may be further held together by use of a threaded fastener 651. If a threaded fastener 651 is used it can be inserted through the upper section 604 of the lever operation throttle control assembly 600.

Those of ordinary skill in the art will understand that the upper section 604 and lower section 605 may be snapped together and a solid post inserted into the handlebar 100. However, as shown in FIG. 11, a fastener 670 may be used. The fastener 670 passes through the upper section 604 and the lower section 605 and then enters the hollow center 619 of the central post 618. The central post 618 is located within the handlebar 100 as shown in the previous embodiments. Thus, after assembly to the handlebar or frame member the fastener 670 may be driven to full engagement to spread apart the legs 600 and 602 of the post 610 which enters the hollow portion of the handlebar 100 and eliminate any clearance between the post 610 and the tubular handlebar of frame member 100. Two arcuate, spaced-apart, flexible flanges 616 are formed integrally under the lower section 605 of the lever operated throttle control assembly 600 to assure a firm connection to the handlebar 100.

To reduce costs of manufacture, the various disclosed embodiments of the control cable positioning and mounting system of the present invention may be molded as a single piece from commonly used plastics.

There is thereby shown by the various embodiments of the control cable positioning and retaining system of the present invention a convenient, easy-to-manufacture, and economical way of positioning and retaining a sheathed control cable near the handlebar of a lawn mower or any other device which uses sheathed control cables mounted to tubular handlebars or frame members.

While the foregoing control cable positioning and retaining system of the present invention has been described with respect to its preferred embodiments, it will be understood by those of ordinary skill in the art that numerous other embodiments of this invention will become apparent to those of ordinary skill in the art once having read the foregoing disclosure. Such other embodiments shall fall within the scope and meaning of the appended claims.

What is claimed is:

1. A mounting system for positioning and returning at least one control cable and conduit assembly near a tubular handlebar or frame member, said at least one control cable and conduit assembly having a conduit portion and a cable portion, and said tubular handlebar or frame member having an outer surface and at least one hole formed through a wall thereof, said mounting system comprising:

means for positioning and retaining the at least one control cable and conduit assembly, said means for positioning and retaining the at least one control cable and conduit assembly comprising a passage having a first section constructed and arranged to engage the conduit portion, and a second section constructed and arranged to allow the cable portion to pass therethrough, wherein said second section is of smaller diameter than said first section;

a pair of integrally molded, arcuate, spaced-apart, flexible flanges depending from said means for positioning and retaining the at least one control cable and conduit assembly;

said integrally molded, arcuate, spaced-apart, flexible flanges constructed and arranged to substantially encircle the outer surface of the tubular handlebar or frame member when attached thereto;

a post emanating outwardly from said means for positioning and retaining the at least one control cable and conduit assembly and positioning between said integrally molded, arcuate, spaced-apart, flexible flanges, said post being constructed and arranged to fit through the at least one hole formed through the wall of the tubular handlebar or frame member when attached thereto.

2. The mounting system as defined in claim 1 wherein said post is hollow.

3. The mounting system as defined in claim 2 wherein said hollow post is expansible by the insertion of a threaded fastener.

4. The mounting system as defined in claim 1 further including at least one keeper slot formed on the external wall of said integrally molded, arcuate, spaced-apart, flexible flange.

5. A mounting system for positioning and returning at least one control cable and conduit assembly near a hollow handlebar or frame member, said at least one control cable and conduit assembly having an end of a conduit portion and a cable portion, and said hollow handlebar or frame member having walls and an outer surface and substantially aligned holes passing through the walls of said hollow handlebar or frame member, said mounting system comprising:

means for positioning and retaining the at least one control cable and conduit assembly;

said means for positioning and retaining the at least one control cable and conduit assembly including a first section for receiving the end of the conduit portion and a second section constructed and arranged to allow the cable portion to pass therethrough, wherein said second section is of smaller diameter than said first section;

a pair of integrally molded, arcuate, spaced-apart, flexible flanges depending from said means for positioning and retaining the at least one control cable and conduit assembly, said integrally molded, arcuate, spaced-apart, flexible flanges constructed and arranged to engage the outer surface of said hollow handlebar or frame member when attached thereto.

6. The mounting system as defined in claim 5 wherein said post is hollow.

7. The mounting system as defined in claim 6 wherein said hollow post is expandable by the insertion of a threaded fastener into its hollow portion.

8. A method for positioning and retaining at least one control cable and conduit assembly in close proximity to a hollow handlebar or frame member, said at least one control cable and conduit assembly having a control cable portion and a conduit portion, and said hollow handlebar or frame member having an exterior and at least one hole formed through a wall thereof, said method comprising the steps of:

passing the control cable portion through a passage formed in an enlarged portion of a control cable and conduit mounting system,
   said passage having an enlarged end compatible with said conduit portion;

inserting the conduit portion into said enlarged end compatible with said conduit portion;

passing a post through the at least one hole formed through the wall of the hollow handlebar or frame member,
   said post emanating from underneath said enlarged portion of the control cable and conduit mounting assembly;

snapping a pair of integrally formed, arcuate, spaced-apart, flexible flanges around the exterior of the hollow handlebar or frame member.

* * * * *